(12) United States Patent
Hjarbæk Holm (10) Patent No.: US 9,393,528 B2
(45) Date of Patent: Jul. 19, 2016

(54) FILTRATION MEMBRANE (75) Inventor: Allan Hjarbæk Holm, Langa (DE)

(73) Assignee: Grundfos Management a/s, Bjerringbro (DK)

(*) Notice: Subject to any disclaimer, the term of this patent is extended or adjusted under 35 U.S.C. 154(b) by 269 days.

(21) Appl. No.: 14/115,242

(22) PCT Filed: Apr. 27, 2012

(86) PCT No.: PCT/EP2012/057739
§ 371 (c)(1),
(2), (4) Date: Nov. 4, 2013

(87) PCT Pub. No.: WO2012/150186
PCT Pub. Date: Nov. 8, 2012

(65) Prior Publication Data
US 2014/0048487 A1    Feb. 20, 2014

(30) Foreign Application Priority Data
May 4, 2011    (EP) .................. 11003650

(51) Int. Cl.
*B01D 39/00* (2006.01)
*B01D 39/14* (2006.01)
*B01D 61/00* (2006.01)
*B01D 29/46* (2006.01)
*B01D 65/02* (2006.01)
*B01D 65/08* (2006.01)
*B01D 67/00* (2006.01)
*B01D 71/02* (2006.01)

(52) U.S. Cl.
CPC ............. *B01D 65/08* (2013.01); *B01D 65/02* (2013.01); *B01D 67/0093* (2013.01); *B01D 71/022* (2013.01); *B01D 2321/04* (2013.01); *B01D 2321/22* (2013.01); *B01D 2321/223* (2013.01); *B01D 2323/38* (2013.01); *B01D 2323/42* (2013.01)

(58) Field of Classification Search
CPC .. B01D 67/0093; B01D 69/10; B01D 71/022; B01D 65/02; B01D 65/08; B01D 71/00
USPC ........................................ 210/500.25, 502.1
See application file for complete search history.

(56) References Cited

U.S. PATENT DOCUMENTS 4,284,492 A    8/1981    Karn
6,287,432 B1    9/2001    Mazanec et al.
(Continued)

OTHER PUBLICATIONS

Gam-Derouich et al, "Electrografted Aryl Diazonium Initiators for Surface-Confined Photopolymerization: A New Approach to Designing Functional Polymer Coatings", Langmuir Article, vol. 26, No. 14, pp. 11830-11840, (Jul. 2010).
Int'l Search Report and Written Opinion issued Jun. 22, 2012 in Int'l Application No. PCT/EP2012/057739.

*Primary Examiner* — Ana Fortuna
(74) *Attorney, Agent, or Firm* — Panitch Schwarze Belisario & Nadel LLP (57) ABSTRACT

A filtration membrane (4) including a porous base layer (8) arranged adjacent to a filtration layer (6) having pores (10) extending through the filtration layer (6) is provided. The filtration layer is electrically conductive and at least one compound (24, 26) is attached on the filtration layer (6), thereby providing a protective surface layer (40). The at least one compound (24, 26) is configured to be at least partially cleaved off of the filtration layer (6) by a predefined cleave-off process.

20 Claims, 9 Drawing Sheets

(56) References Cited

U.S. PATENT DOCUMENTS

2007/0084797 A1 4/2007 Cooper et al.
2007/0272607 A1 11/2007 Kozlov et al.
2012/0312687 A1* 12/2012 Miller .................. B01D 53/228
  204/520
2012/0312737 A1* 12/2012 Miller .................... B01D 71/10
  210/500.25

* cited by examiner

FILTRATION MEMBRANE

CROSS-REFERENCE TO RELATED APPLICATIONS

This application is a Section 371 of International Application No. PCT/EP2012/057739, filed Apr. 27, 2012, which was published in the English language on Nov. 8, 2012, under International Publication No. WO 2012/150186 A1 and the disclosure of which is incorporated herein by reference.

BACKGROUND OF THE INVENTION

The present invention relates generally to a filtration membrane. More particularly, the present invention relates generally to a filtration membrane intended or configured for filtration of fluids in which the occurrence of fouling represents a significant problem and/or challenge.

Membranes are used in a wide variety of separation applications, including food and beverage and water treatment industries. By nature, the surface of the membrane contains pores onto which organics, bacteria, and microbes can readily settle, particularly when there is an applied pressure on the system to increase water flux across the membrane.

Depending on the specific system, a wide variety of membrane fouling can occur, such as scaling due to concentration polarization, bio-fouling due to adhesion of bacteria and growth of biofilms, colloidal fouling from suspended particles, organic films from natural organic matter and humic acids, by way of example.

In some applications, repetitive use of back flush is not sufficient to keep the membrane clean, and thus a cleaning process (CIP), in which cleaning chemicals are used, is required. In heavy fouling fluids, it would be an advantage to have a filtration membrane having intrinsic anti-fouling properties.

BRIEF SUMMARY OF THE INVENTION

An objective of a preferred embodiment of the present invention is to provide a filtration membrane that is easy to use and clean when applied in heavy fouling fluids.

It is also an objective of a preferred embodiment of the present invention to provide a filtration membrane that is suitable or capable of being used in applications in which back flush is not sufficient to clean the membrane.

The above objectives can be achieved by a filtration membrane having a porous base layer attached to an electrically conductive filtration layer and at least one compound attached on the filtration layer. Preferred embodiments are defined in the dependant claims and explained in the following description and shown in the accompanying drawings.

The filtration membrane according to a preferred embodiment of the present invention comprises a porous base layer attached to an electrically conductive filtration layer having pores extending through the filtration layer. At least one compound is attached on the filtration layer and thereby provides a protective surface layer. The at least one compound is configured to be at least partially cleaved off of the filtration layer by a predefined cleave-off process.

The electrically conductive filtration layer may have an electrical conductivity exceeding $1000\ S\ m^{-1}$ (or S/m) at 293 K.

The protective surface layer inhibits a fouling layer from growing on the filtration layer. The fouling layer is prevented from growing directly at the surface of the filtration layer. Fouling can grow on the protective surface layer and this fouling can be removed by cleaving off the at least one compound from the filtration layer. Thus, the filtration membrane is easy to use and clean when applied in heavy fouling fluids. Also, the filtration membrane is suitable for use in applications in which back flushing is not sufficient to clean the membrane.

Advantageously, according to a preferred embodiment of the present invention, the at least one compound is configured to be attached on the filtration layer and to be at least partially cleaved off the protective surface layer filtration layer by a reversible electrochemical process.

An electrochemical process may used to provide a very accurate control of the attachment of the protective surface layer. When a reversible electrochemical process is applied, it is possible to build the protective layer and to at least partially cleave the protective layer off by using electrochemical regulation means.

A reversible electrochemical process may carried out by using a two electrode system (a working electrode and a counter electrode) or a three electrode system (a working electrode, a counter electrode and a reference electrode) to provide an electric field at the filter membrane surface and thereby influence and control the electrochemical processes in a region at and close to the surface of the filtration membrane.

It is possible to attach a compound on the filtration layer by using a heat source to heat up the part of the filtration layer on to which the at least one compound is intended to be attached. It is also possible to at least partially cleave off a compound from the filtration layer by heating up areas of the filtration membrane.

Preferably, the heating process is carried out locally at the filtration surface. In this way, the intended chemical reactions will occur only at the areas that are heated up.

It may beneficial that the at least one compound is a diazonium salt:

$R-N_2^+X^-$, where R is aryl and where X is an inorganic or organic anion.

Diazonium salts are capable of generating a very reactive compound that can be attached on the filtration layer. When an electron is transferred to a diazonium salt, a highly reactive compound is created and this compound can attach to the filtration layer and thereby start building up a protective surface layer at the filtration layer if the reactive compound is situated close to the surface of the filtration layer.

Preferably, the diazonium compound is of the following form:

$R-N_2^+X^-$, where R is aryl and where X is an inorganic anion

The above types of diazonium salts are suitable of being used to build up a protective surface layer at the filtration layer surface.

Advantageously, according to a preferred embodiment of the present invention, the filtration membrane is configured in a manner so that the thickness of the protective surface layers can be controlled by using an electrochemical process. The protective surface layer may comprise one or more layers of at least one compound. It is possible to use compounds containing polyethylene glycol (PEG) chains of various chain lengths and thereby provide either a thin protective surface layer or a thicker protective surface layer.

Thus, the effect of various thicknesses of the grafted layer can be achieved. It would be possible to provide the best anti-fouling property depending on the fluid and the properties of the filtration membrane. Advantageously, according to a preferred embodiment of the present invention, an electrochemical process is used to control the thickness and/or porosity of the protective surface layer, because an electrochemical process can be used to exercise at least partial regulation of the layer thickness. This will be known to a person skilled in the art.

An electrochemical process may be applied to deliver electrons to the diazonium salts at a certain distance from the surface of the filtration layer. When a high voltage (potential) is applied at the filtration layer surface, a protective layer generating chemical reaction can be initiated at a comparatively large distance from the surface of the filtration layer. However, in a situation where a low voltage (potential) is applied at the filtration layer surface, a protective layer generating chemical reaction can be initiated at a shorter distance from the surface of the filtration layer.

According to a preferred embodiment of the present invention, it is advantageous to use a diazonium salt of the following form:

The diazonium salt of a), 4-(carboxyl) phenyl diazonium tetrafluoroborate, is easily synthesized using protocols well known to a person skilled in the art from a pertinent precursor (p-amino-benzoic acid). According to a preferred embodiment of the present invention, it is advantageous to use this particular diazonium compound due to its hydrophilic character as well as its ability to be deprotonated/protonated as a function of pH (i.e., reversibly tune its hydrophilic and charge character). This characteristic may be advantageous in media in which an increase of the hydrophilic character of the membrane reduces the propensity of membrane fouling. In addition, it is known that charged layers on membranes have a tendency to reduce fouling.

The diazonium salt of b), 4-(methoxy) phenyl diazonium tetrafluoroborate, is easily synthesized using protocols well known to a person skilled in the art from a pertinent precursor (p-methoxy aniline). Another related promising compound is provided by the commercially available Fast Blue BB salt. According to a preferred embodiment of the present invention, it is advantageous to use these particular diazonium salts as they provide a simplified system incorporating the ether linkage between the benzene ring and substituent. This, in part, increases the hydrophilic character of the film formed at the surface. Due to the strong electron donating nature of this substitution pattern, such protective layers are comparatively easy to oxidize (i.e., to cleave off the surface).

The diazonium salt of c), 4-(2-(2-(methoxy)ethoxy)ethoxy) phenyl diazonium tetrafluoroborate, may offer significant advantages due to the incorporation of a polyethylene glycol function in the layer. It has been shown that polyethylene glycol functionalities in membranes make the membranes much less prone to fouling. In particular, this functionality is known to reduce the so-called adsorptive fouling in which a first layer of water molecules is replaced by the fouling solute. The reduction of adsorptive fouling is mainly due to the hydrophilic character of the polyethylene glycol functionality. This may be advantageous in media in which increasing the hydrophilic character of the membrane reduces the propensity of membrane fouling.

The fourth example d), 4-(nitro) phenyl diazonium tetrafluoroborate, is a well known salt to a person skilled in the art. The advantage of this particular salt is that its hydrophilic character may be varied by controlling the oxidation state of the appended nitrogen atom. In the highest oxidation state, $NO_2$, it is somewhat polar but can easily (for example, by electrochemical means) be transformed into the reduced forms, such as hydroxyl amine, —NHOH, or amine, —$NH_2$. These latter functional groups can be deprotonated/protonated by a change in the pH of the medium and, thus, they also have the option to exercise controlled hydrophilic character. Moreover, by reduction of the nitro group to hydroxyl amine or amine, the electronic properties of the nitrogen can be tuned. The nitro group is a strong electron withdrawing group, whereas the amine functionality is an electron donating group with the hydroxylamine placed in between. Tuning of the electronic properties of the functional group provides a means for change in the surface properties of the filtration layer. Furthermore, if either 4-(hydroxylamine) phenyl diazonium tetrafluoroborate or 4-(amino) phenyl diazonium tetrafluoroborate is attached to the filtration layer surface, the nitrogen based functional groups provide a tag for further chemical modifications of the surface which are not possible with the nitro group.

According to a preferred embodiment of the present invention, it is an advantage that the filtration layer is a metal layer. Since a metal layer is electrically conductive, it is possible to connect the filtration layer to an electrical source and thereby use the filtration layer as a working electrode. Thus, a compound can be attached on the filtration layer and thereby provide a protective surface layer by simple means. The at least one compound can be at least partially cleaved off of the filtration layer by changing the voltage applied to the surface of the filtration layer.

It is also possible to have a filtration layer made in another electrically conductive material, such as an electrically conductive composite, carbon or another suitable material.

It may be an advantage that the filtration layer is made of stainless steel. Stainless steel has several advantageous properties that make it suitable for being used as filtration layer in a filtration membrane according to a preferred embodiment of the present invention. It is possible to provide a corrosion resistant stainless steel filtration layer having pores in the desired size range, for example, by a sintering process.

According to a preferred embodiment of the present invention, it is an advantage to have a filtration membrane in which the porous base layer and the filtration layer are made of the same material. It may be beneficial that the porous base layer and the filtration layer are made in stainless steel.

It may be beneficial that the pore size in the filtration layer lies within the range between 10 nm and 500 nm, preferably between 10 nm and 200 nm. A filtration membrane having a filtration layer with pores within these ranges can be applied to filter fluids in the desired filtration range. It is possible to have a filtration layer with huge, moderate or low pore size deviation. In some applications, it may be an advantage that the filtration layer has pores in a large size range. In other applications, it may be an advantage that the pores in the filtration layer are of basically equal sizes.

It may be beneficial that the pore size in the porous base layer lies within the range between 100 nm to 100 µm, preferably 0.5-10 µm. As such, it is achieved that the filtered fluid easily can be transported through porous base layer. A porous base layer having pores in this range can be provided with the required mechanical strength so that it is suitable for being used as a base for the filtration layer.

Advantageously, the thickness d of the filtration layer is 50 nm-10 µm, preferably 200 nm-1000 nm. As such, it is achieved that an optimum filtration can be carried out by the filtration layer and that the filtration layer has the required mechanical strength and is sufficiently thin to provide an optimum flux through the filtration layer.

It may be beneficial that the thickness d of the porous base layer is 300-3000 µm, preferably 500-1500 µm. As such, the porous base is provided with the required mechanical strength and is thus suitable for being used a a base for the filtration layer.

It is possible to use the filtration membrane in a filtration system. The filtration system may be any suitable type of filtration system. Such a system may be very simple and require manual process. An alternative system may be fully or partially automated. It may be an advantage to apply the filtration membrane in a filtration system that is adapted to the specific application.

Advantageously, a filter membrane according to a preferred embodiment of the present invention is used to filter the fluid. Such a method makes it possible to carry out filtration of heavy fouling fluids in applications in which back flushing is not sufficient to clean the membrane.

It may be an advantage that the filtration membrane is plate shaped and has a rectangular geometry. It is possible to have a filtration membrane that consists of several filtration membranes put together into one larger filtration membrane.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Other objects and further scope of applicability of the present invention will become apparent from the detailed description given hereinafter. It should be understood, however, that the detailed description and specific examples and indications of preferred embodiments of the invention, are given by way of illustration only, since various changes and modifications within the spirit and scope of the invention will be apparent to those skilled in the art from this detailed description.

Figure 1:
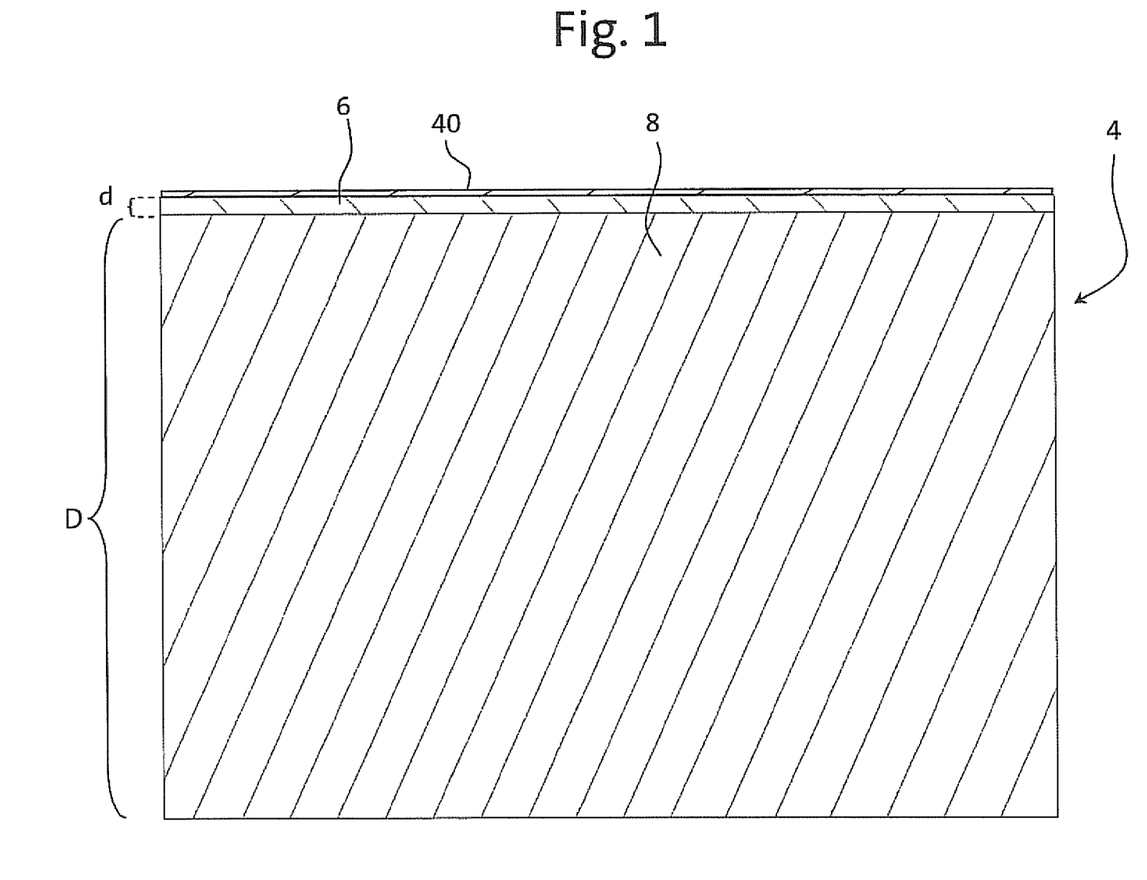
FIG. 1 is a schematic cross-sectional view of a filtration layer of a filtration membrane according to a preferred embodiment of the present invention.
Figure 2:
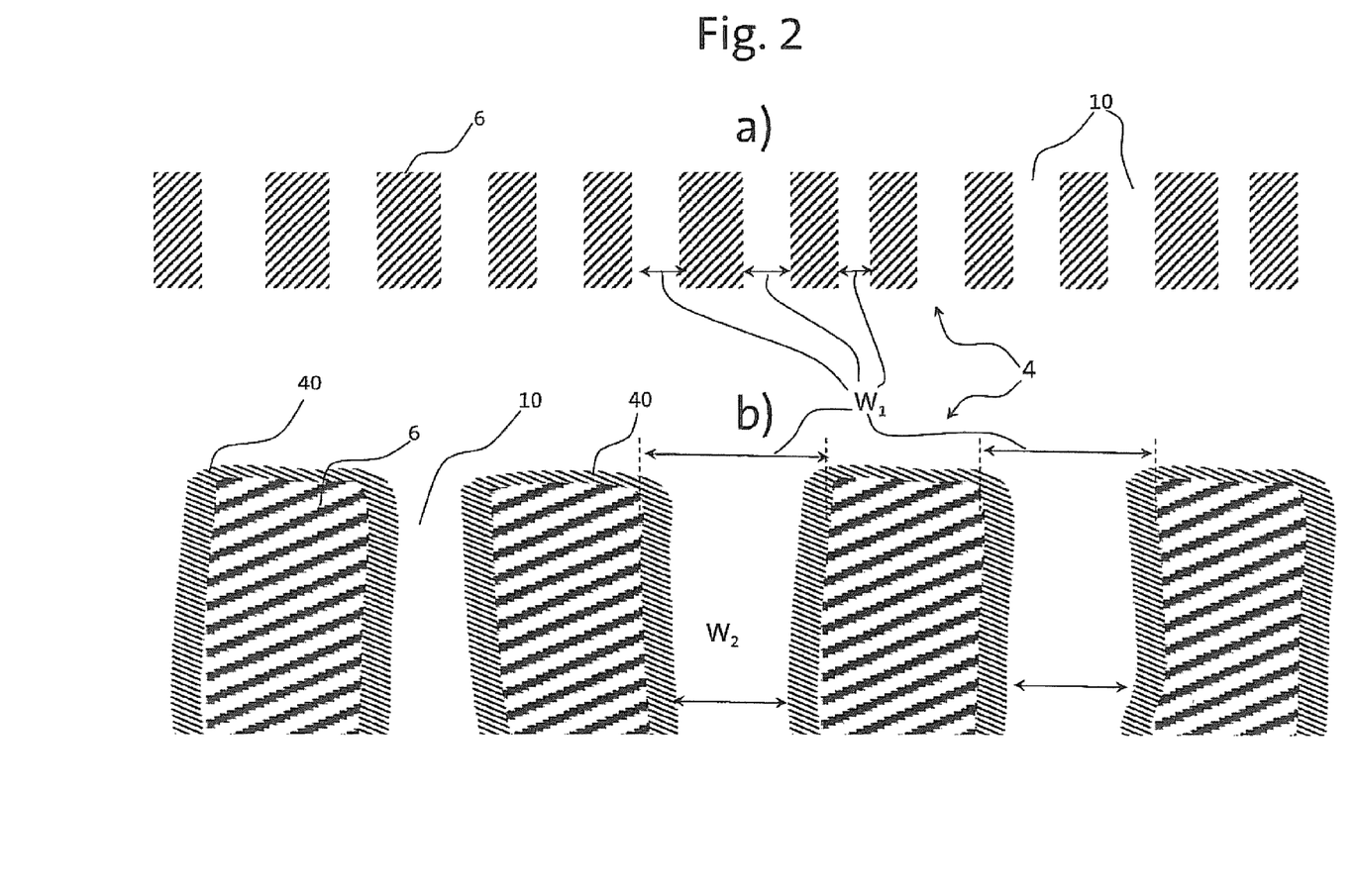
FIG. 2*a* is a schematic cross-sectional view of a filtration layer of a filtration membrane according to a preferred embodiment of the present invention.
FIG. 2*b* is an enlarged view of a filtration layer provided with a protective surface layer.
Figure 3:
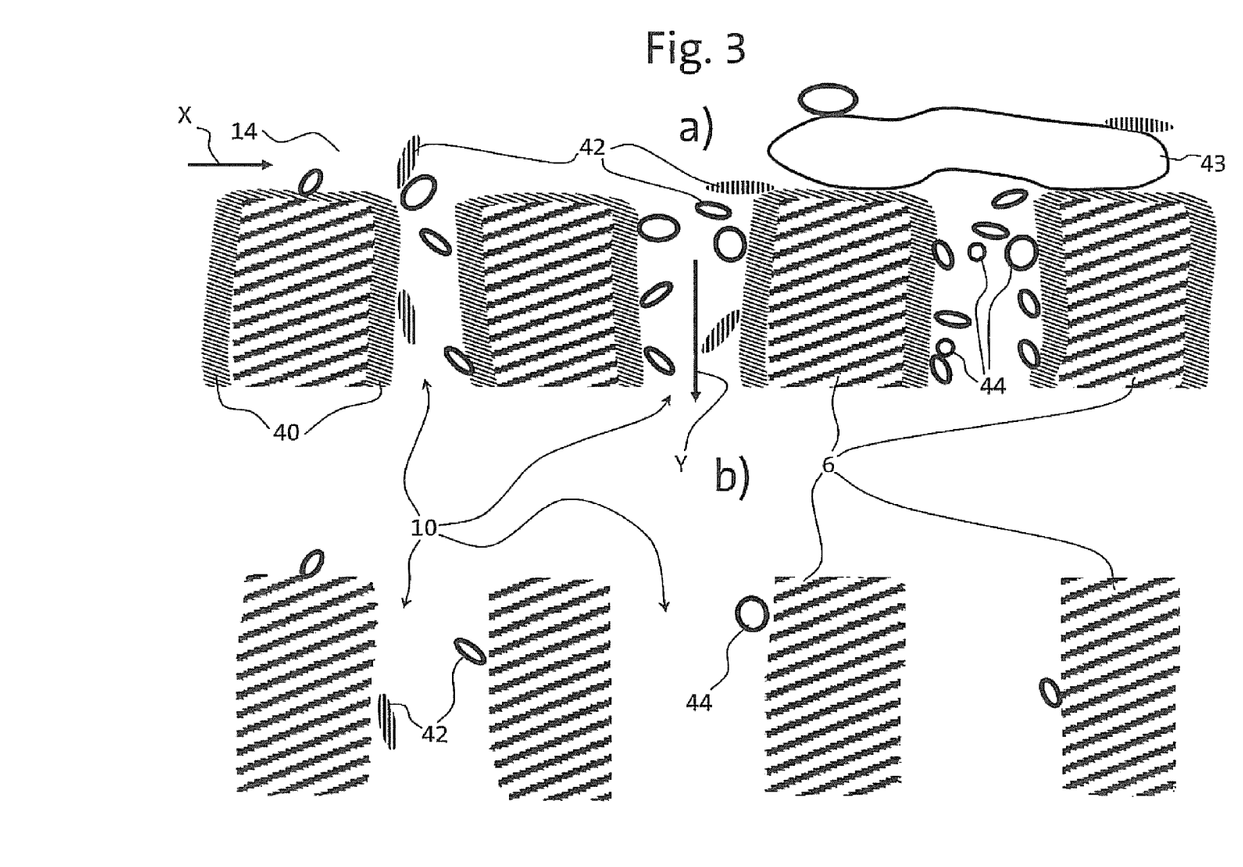
FIG. 3*a* is an enlarged view of a filtration layer during a filtration process.
FIG. 3*b* is an enlarged view of a filtration layer after the protective surface layer has been removed from it.

Referring now in detail to the drawings for the purpose of illustrating preferred embodiments of the present invention, elements of a filtration membrane 4 according to a preferred embodiment of the present invention are illustrated in FIG. 1-3. The filtration membrane 4 comprises a porous base layer 8 and a filtration layer 6. The filtration layer 6 is attached to the base layer 8 and the filtration layer 6 is provided with pores 10 extending through the filtration layer 6. The pores 10 of the filtration layer 6 may preferably be configured to filter foulants or particles within a specific size range, since filtration of small foulants and small particles generally requires smaller pores than filtration of larger particles and foulants.

FIG. 1 shows that the thickness d of the filtration layer 6 is much smaller than the thickness D of the base layer 8. A compound is attached on the filtration layer 6 so that the attached compound constitutes a protective surface layer 40. The protective surface layer is configured to be at least partially cleaved off of the filtration layer 6. Moreover, the filtration layer 6 is configured in a way so that a compound can be attached on the filtration layer 6 after the protective layer has been completely or partially cleaved off the filtration layer 6. This may be done by using various methods.

According to a preferred embodiment of the present invention, it is an advantage that the base layer 8 is made in a porous material on to which it is easy to attach the filtration layer 6. According to a preferred embodiment of the present invention, it is an advantage that the base layer 8 and the filtration layer 6 are made of the same materials. By way of example, it is possible to make the base layer 8 and the filtration layer 6 in stainless steel. However, it is possible to apply any other suitable material. It is possible to apply ceramic materials, composites, metals or another suitable material. It is also possible to make the base layer 8 and the filtration layer 6 of two different materials. A person skilled in the art would be able to join the base layer 8 and the filtration layer 6 even if they are made of different materials.

The filtration membrane 4 may have any suitable geometry. By way of example, the filtration membrane 4 may be plate shaped. It is possible to have a filtration membrane 4 that has a curved geometry of a plane geometry. It is possible to build a large filtration membrane 4 out of several smaller filtration membranes 4 that are put together to constitute a large filtration membrane 4.

FIG. 2a illustrates an enlarged view of a filtration membrane 4 having a filtration layer 6 with a number of pores 10. The width $W_1$ of the pores 10 of the filtration layer 6 are indicated in FIG. 2 and it can be seen that the width $W_1$ of the pores 10 vary. It may be assumed that the width $W_1$ of the pores 10 follow a Gaussian distribution.

FIG. 2b illustrates an enlarged view of a filtration layer 6 of a filtration membrane 4 according to a preferred embodiment of the present invention. The filtration layer 6 is provided with a protective surface layer 40. The protective surface layer 40 is thinner than half of the width $W_1$ of the pores 10 of the filtration layer 6. The width $W_1$ of the pores 10 of the filtration layer 6 vary slightly. The filtration layer 6 is provided with a surface layer 40 that covers the surface of the filtration layer 6. Accordingly, the whole surface of the filtration layer 6 is protected by the surface layer 40.

The thickness of the protective surface layer 40 may vary. It is possible to have a filtration layer 6 with a thickness of 1-500 nm, by way of example. The width $W_2$ of the free space in the pores 10, after the protective surface layer 40 has been deposited on the filtration layer 6, is significantly smaller than the width $W_1$ of the free space in the pores 10 before the protective surface layer 40 deposition has occurred. Therefore, the deposition of the protective surface layer 40 affects the filter characteristics of the filter membrane 4. The width $W_1$ of the free space in the pores 10, before the surface layer 40 has been attached to the filtration layer 6, may be in the range of 10-500 nm, by way of example, and the width $W_2$ of the free space in the pores 10, after a surface layer 40 has been deposited on the filtration layer 6, may be decreased by 2-50%, by way of example.

It is, as an example, possible to have a filtration membrane 4 in which the width $W_1$ of the free space in the pores 10, before the surface layer 40 has been attached to the filtration layer 6, is 100 nm and where the width $W_2$ of the free space in the pores 10 after a surface layer 40 has been deposited on the filtration layer 6 is 50 nm.

FIG. 3a illustrates an enlarged view of a filtration layer 6 of a filtration membrane 4 during a filtration process. During the filtration process, the fluid 14 that is being filtered by a membrane filter 4, according to a preferred embodiment of the present invention, is being guided along the surface of the filtration layer 6 of the filtration membrane 4. When a filtration membrane 4 according to a preferred embodiment of the present invention is used in a cross flow filtration setup, a mean stream of the fluid 14 may travel along an axis, X, that is parallel to the surface of the filtration layer 6. A portion of the fluid 14 enters the pores 10 of the filtration layer 6 and this portion of the fluid 14 is moving along the axis, Y, perpendicular to the surface of the filtration layer 6. It can be seen from FIG. 3a that foulants 42, 43, 44 are present in the fluid 14 and that some of these foulants 42, 43, 44 settle along the surface of the pores 10. This phenomenon is known as fouling. Settlement of foulants 42, 43, 44 will increase the resistance for fluid passage through the pores 10. Accordingly, the flux across the filtration membrane 4 (especially the flux through the filtration layer 6 of the filtration membrane 4) will decrease unless a higher pressure is applied to force fluid through the filtration membrane 4.

FIG. 3a shows that the fouling occurs at a distance from the filtration layer 6 because the protective surface layer 40 is protecting the filtration layer 6.

In FIG. 3b the protective surface layer 40 has been removed by a "cleave-off process" (this may be done by using electrochemical means). Even though most of the foulants 42, 44 have been removed from the filtration layer 6, a few foulants 42, 44 are still attached to the filtration layer 6. However, since the filtration layer 6 is almost free of foulants 42, 43, 44, the filtration layer 6 is suitable for being used to filter a fluid 14. Preferably, a new protective surface layer 40 is provided to the filtration layer 6 before the filtration layer 6 is used to filter the fluid 14. The foulants 42, 43, 44 may, in principle, be any type of foulants, such as bacteria or inorganic particles, by way of example.

In some applications, it may be possible to cleave off all foulants 42, 43, 44 from the filtration layer 6. A new protective surface layer 40 may preferably be grafted on the filtration layer 6 before the filtration layer 6 is being reused to filter a fluid 14.

Figure 4:
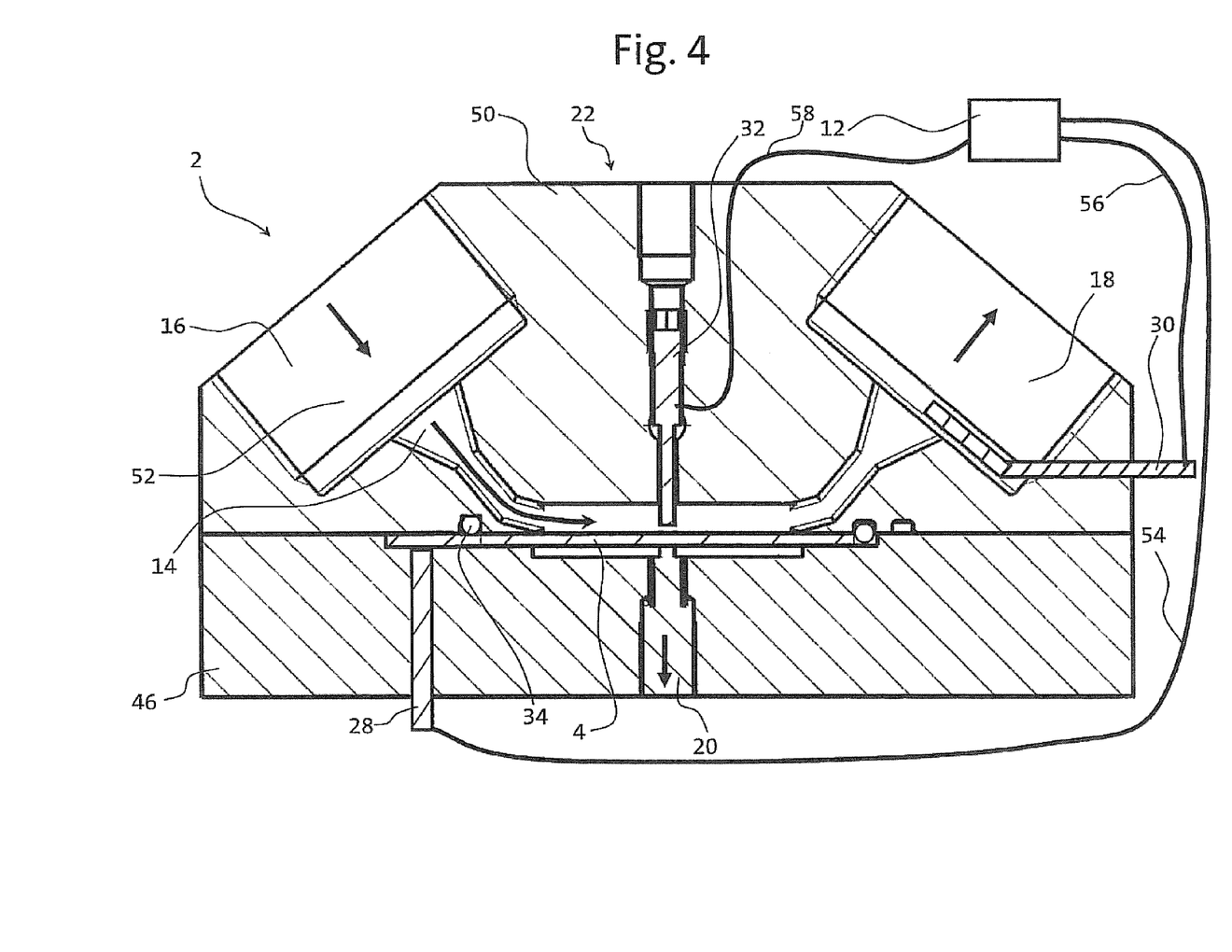
FIG. 4 is a schematic cross-sectional view of a filtration system according to a preferred embodiment of the present invention.

FIG. 4 illustrates a schematic cross-sectional view of a filtration system 2 using a filtration membrane 4 according to a preferred embodiment of the present invention. The filtration system 2 comprises a housing 22 configured to guide a fluid 14 along a filtration membrane 4. The housing 22 comprises a fluid inlet 16 through which the fluid 14 enters the housing 22. The housing 22 moreover comprises a fluid outlet 18 for guiding away the fluid 14 that has passed the filtration membrane 4. The fluid 14 that is drained through the fluid outlet 18 may be circulated to the fluid inlet 16 through a fluid pipeline (not shown).

The housing 22 comprises a base member 46 and a top member 50. Together, the base member 46 and the top member 50 constitute a space 52 configured to receive and guide the fluid 14 from the fluid inlet 16 along the surface of the filtration membrane 4 and through the fluid outlet 18.

That portion of the fluid that 14 enters the filtration membrane 4 will initially pass through the surface of the filtration layer 6 (see FIG. 1) that will retain items in the liquid that are larger than the pore size of the membrane. Thereafter, the filtered fluid (permeate) will continue through the base layer 8 and eventually be drained through the permeate outlet 20. The travel direction of the fluid is indicated with arrows in FIG. 4.

A seal ring 34 is provided between the filtration membrane 4 and the distal ends of the filtration membrane 4 and the side members 46, 48 and the top member 50. An electrical source 12 is arranged next to the filtration system 2. This electrical source 12 delivers the voltage that is applied to the working electrode 28, the counter electrode 30 and the reference electrode 32. The working electrode 28 is connected to the electrical source 12 by a wire 54. The counter electrode 30 is connected to the electrical source 12 by a wire 56 and the reference electrode 32 is connected to the electrical source 12 by a wire 58. The electrical source 12 may comprise or be connected to a control unit (not shown) that is configured to regulate the potential at the working electrode 28, the counter electrode 30 and the reference electrode 32. The control unit may be configured to regulate the potential at the electrodes 28, 30, 32 on the basis of external inputs (sensor inputs by way of example).

When a suitable potential is provided to the surface of the filtration membrane 4, the surface of the filtration membrane 4 is capable of delivering electrons to compounds in the surrounding fluid 14. Thus, it is possible to initiate an electrochemical process. Under some conditions, it is possible to reduce a compound 24, 26 when a positive electrical potential (relative to the counter electrode 30) is applied on the surface of the filtration membrane 6. Under other conditions, reduction of a compound 24, 26 requires that a negative potential is applied on the surface of the filtration membrane 6.

When a diazonium salt is present in the fluid 14 and the required conditions are present near the surface of the filtration membrane 4, it is possible to reduce a diazonium salt 24, 26 that is present in the fluid 14. The diazonium salt can be reduced when a chemical driving force is present so that the will receive an electron and thereby cleave to release nitrogenous gas ($N_2$) and generate a highly reactive radical, R, that preferably connects to the surface of the filtration membrane 4 by the creation of a covalent bond (see FIG. 9b). Under some conditions, it is possible to reverse the electrochemical process and thereby at least partly cleave off the grafted protective surface layer 40 of the filtration layer 6 of the filtration membrane 4, by changing the electrochemical potential and/or polarity of the working electrode 28 and the counter electrode 30. Under some conditions, only very small changes in the potential of the filtration layer 6 of the filtration membrane 4 are required to initiate grafting of a protective surface layer 40 and/or to completely or partially cleave off a protective surface layer 40. Under some conditions, even a positive potential (measured relative to the counter electrode) at the filtration membrane 4 can initiate grafting of a protective surface layer 40.

It is possible to use a direct current or an alternating current to control the build up of a protective surface layer 40 and the "cleave-off process". Electrical pulsations may be used to provide the intended polarization of the filtration membrane 4 via the working electrode 28. It is possible to use sensor signals to regulate when a protective surface layer 40 has to be grafted and when a protective surface layer 40 has to be cleaved off. A useful sensor signal may be the flux through the filtration membrane 4 or the transmembrane pressure (TMP).

Advantageously, the protective layer 40 is cleaved off during a back flush process. Thus, it is possible to make a very efficient cleaning of the filtration membrane 4. The protective layer 40 prevents fouling from growing directly on the surface of the filtration membrane 4. Instead, the fouling grows on the protective surface layer 40. Accordingly, most of the fouling will be removed from the filtration membrane 4 when the protective surface layer 40 is cleaved off the filtration membrane 4.

It is possible to have a two electrode system consisting of a working electrode 28 and a counter electrode 30.

When a diazonium salt is used to build up a protective surface layer 40, the protective surface layer 40 is very resistant due to the nature of the covalent bindings to the surface of the filtration membrane 4. The protective surface layer 40 may be temperature resistant up to 300° C. Therefore, such a protective surface layer 40 is useful to filter a huge area of fluids during rather extreme conditions. This includes liquid as well as gas separation at elevated temperatures.

Figure 5:
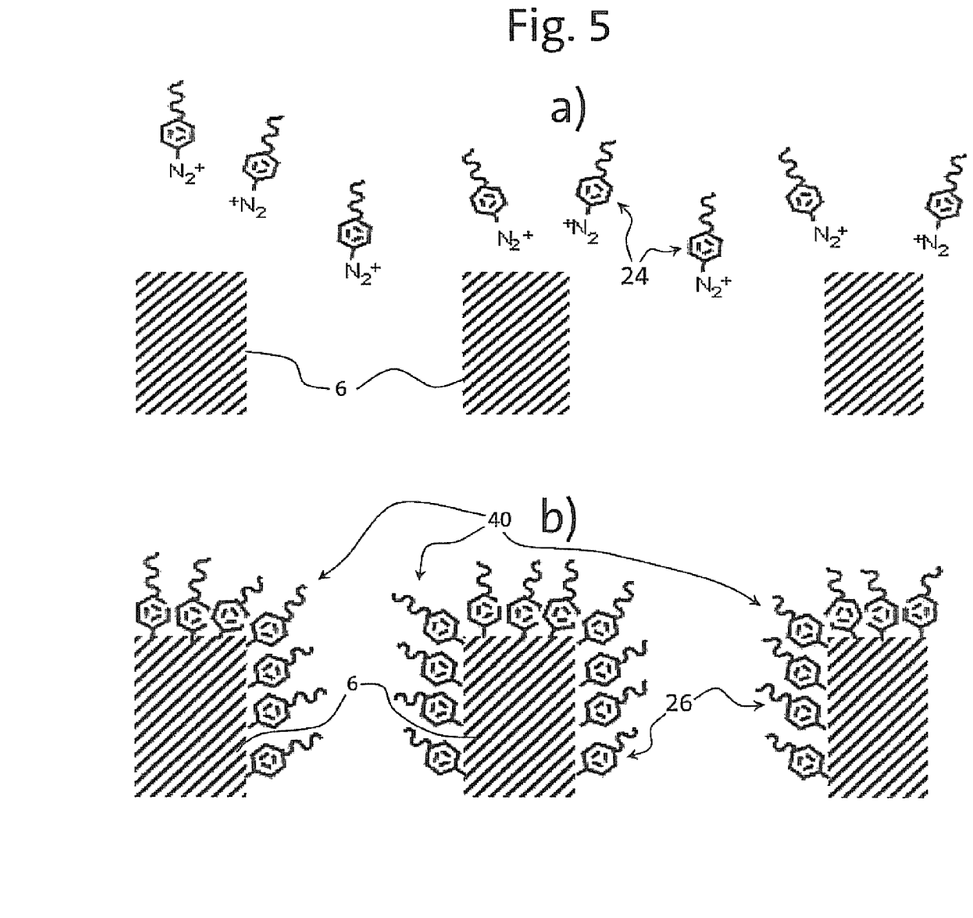
FIG. 5*a* is an enlarged view of a filtration layer before attachment of a compound to the filtration layer surface.
FIG. 5*b* is an enlarged view of the filtration layer shown in FIG. 5*a* when the compound is attached to the filtration layer surface.

FIG. 5a is an enlarged view of a filtration layer 6 in a situation where no compounds 24 have been attached to the surface of the filtration layer 6. A group of diazonium salts 24 are present in the fluid near the filtration layer 6 of the filtration membrane 4. When free electrons, are present (for example, released from the electrically conducting filtration layer 6 of the filtration membrane 4), the diazonium salts 24 will react and decompose and release nitrogenous gas $N_2$ and a radical, R, that can attach on the filtration layer 6 of the filtration membrane 4. A layer of attached compounds 26 constitute a protective surface layer 40, such as the one shown in FIG. 5b.

Figure 6:
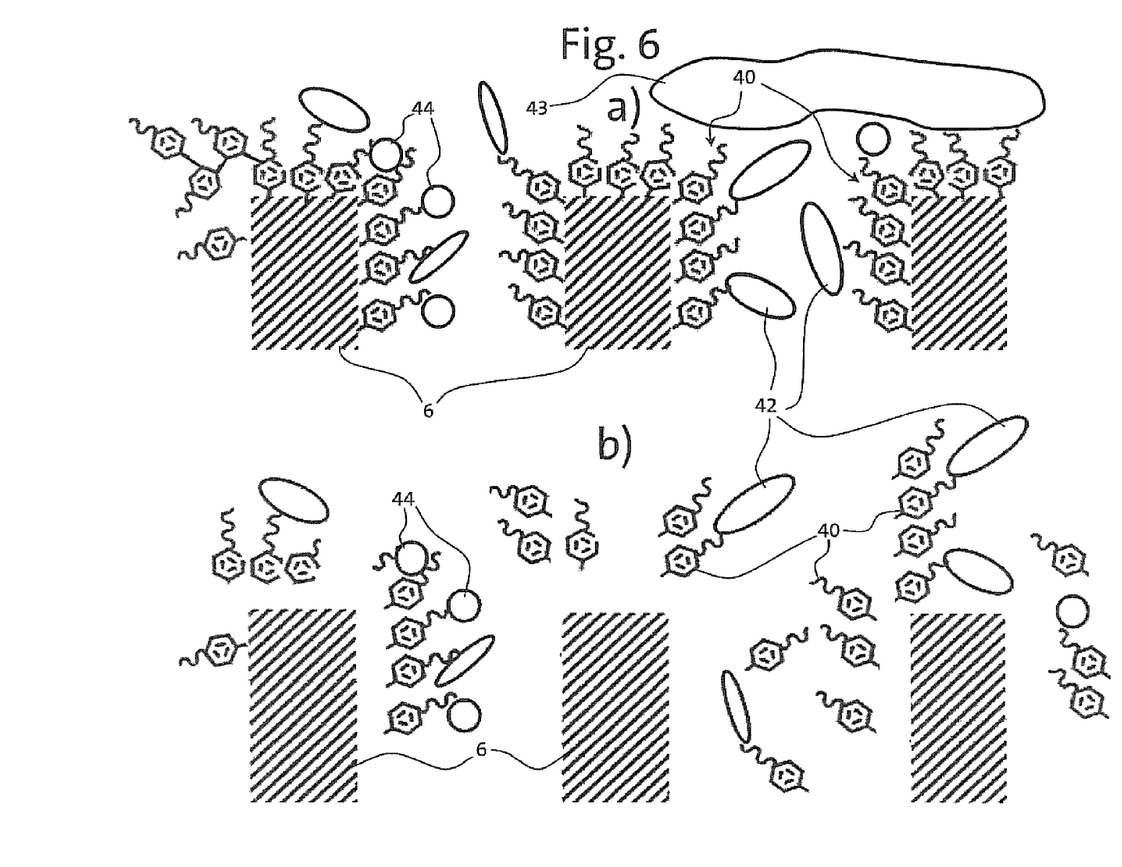
FIG. 6*a* is an enlarged view of a filtration layer according to a preferred embodiment of the present invention.
FIG. 6*b* is an enlarged view of a filtration layer in a situation where the surface layer is being cleaved off the filtration layer.

FIG. 6a shows an enlarged view of a filtration layer 6 of a filtration membrane 4 according to a preferred embodiment of the present invention. The filtration membrane 4 is used to filter a contaminated fluid. The fluid contains foulants 42, 43, 44. A protective surface layer 40 is attached on the filtration layer 6. The protective surface layer 40 prevents the foulants 42, 43, 44 from settling directly on the filtration layer 6. Instead, the foulants 42, 43, 44 settle on the protective surface layer 40.

FIG. 6b shows an enlarged view of a filtration layer 6 of a filtration membrane 4 according to a preferred embodiment of the present invention. FIG. 6b illustrates a situation where the protective surface layer 40 is being cleaved off of the filtration layer 6 during a back flush process. It can be seen that the fouling layer foulants 42, 43, 44 are attached on the protective layer 40 of the filtration layer 6. The foulants 42, 44 and the main portion of the protective surface layer 40 are released from the filtration layer 6. In FIG. 6b, a minor part of the protective surface layer 40 is still attached on the surface of the filtration layer 6 after the "cleave-off process" has been carried out. The cleaved-off process may be, at least partially, controlled by regulating the electrical potential at the working electrode 28 and/or the counter electrode 30 and/or the reference electrode 32.

Figure 7:
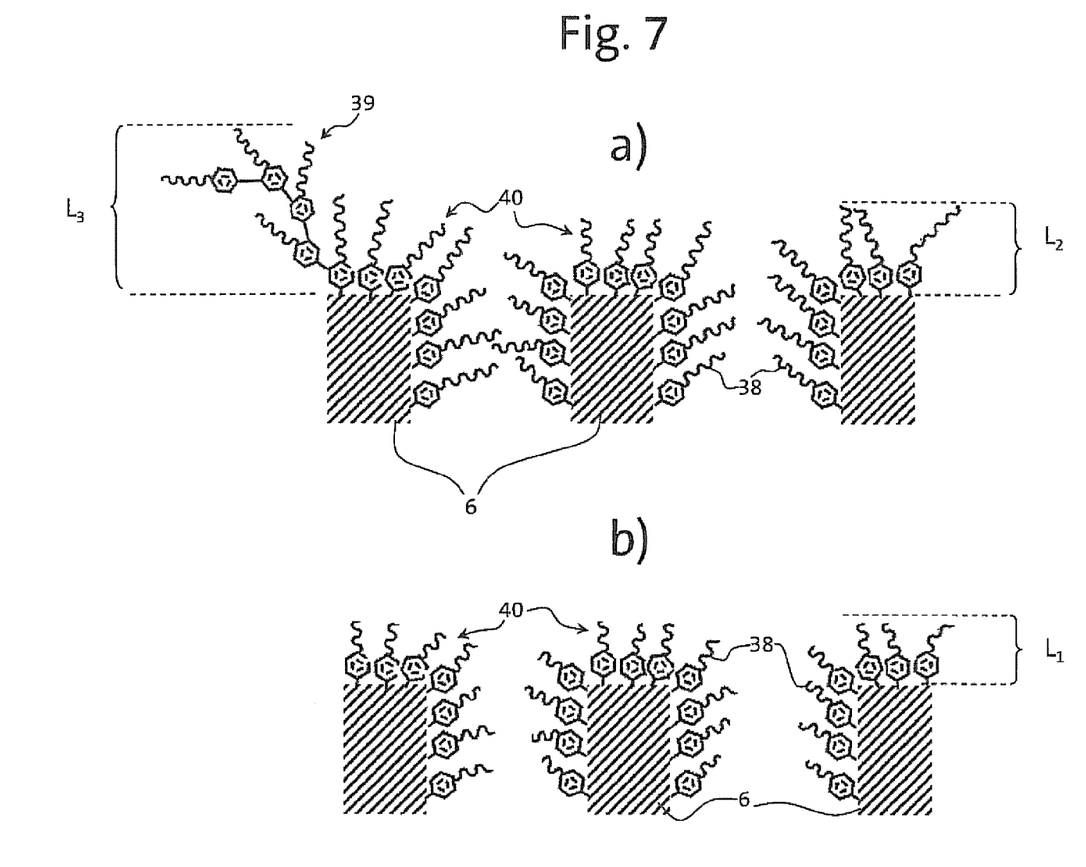
FIG. 7*a* is an enlarged view of a grafted layer where the compounds are having long chain lengths.
FIG. 7*b* is an enlarged view of a grafted layer where the compounds are having shorter chain lengths.

FIG. 7a illustrates an enlarged view of a grafted protective surface layer 40 where the compounds have long chains 38 so that the layer thickness $L_2$ of the protective surface layer 40 is relatively large. The grafted protective surface layer 40 may be a diazonium salt layer containing polyethylene glycol (PEG) chains. A multilayer 39 is grafted on the filtration layer 6 by providing several layers on the top of each other. Thus, a larger layer thickness $L_3$ is achieved.

FIG. 7b illustrates an enlarged view of a grafted protective surface layer 40 where the compounds have shorter chains 38. The layer thickness $L_1$ of the protective surface layer 40 is small compared with the layer thickness $L_1$ illustrated in FIG. 7a.

Figure 8:
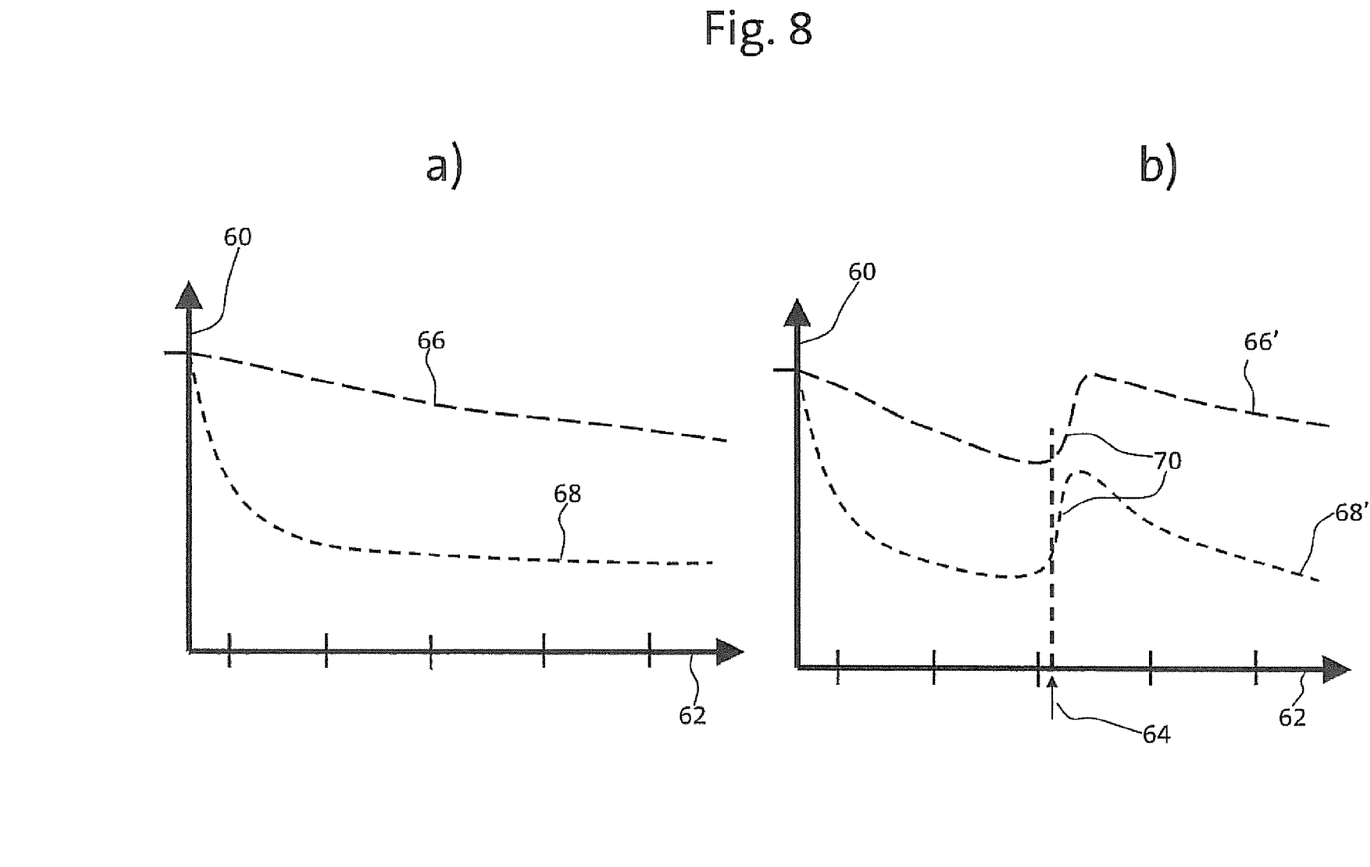
FIG. 8*a* is a graph of the flux ratio versus time for a prior art filtration membrane and a filtration membrane according to a preferred embodiment of the present invention.
FIG. 8*b* is a graph of the flux ratio versus time before and after a CIP process for a prior art filtration membrane and a filtration membrane according to a preferred embodiment of the present invention.

FIG. 8a illustrates a graph showing the flux ratio 60 as function of time 62 for a typical filtration membrane that has not been modified and a filtration membrane according to a preferred embodiment of the present invention, respectively. The flux ratio 60 as function of time 62 for the filtration membrane according to a preferred embodiment of the present invention is indicated by the top curve 66. The flux ratio 60 as function of time 62 for the non-modified filtration membrane is indicated by the lower curve 68.

It can be seen that the flux ratio 60 of filtration membrane 4 according to a preferred embodiment of the present invention is higher than the flux ratio 60 of the prior art filtration membrane. It can also be seen that the flux ratio 60 of the prior art filtration membrane decreases much faster than the flux ratio 60 of the filtration membrane 4 according to a preferred embodiment of the present invention. The protective layer 40 on the filtration membrane 4 according to a preferred embodiment of the present invention inhibits growth of a fouling layer directly on the surface of the filtration layer 6 of the filtration membrane 4. Therefore, it is possible to keep the filtration layer of the filtration membrane 4 cleaner for a longer time period compared to a prior art filtration membrane. Since the filtration layer 6 of the filtration membrane 4 according to a preferred embodiment of the present invention is subject to less fouling or more easily removable fouling than a traditional non-modified filtration membrane, a high flux ratio 60 can be maintained over a long time period. This means that also the flux, under fixed pressure conditions, can be kept high.

FIG. 8b is a graph showing the flux ratio 60 versus time 62 before and after a clean in place (CIP) process. The curve 68' is for a typical non-modified filtration membrane while curve 66' is for a filtration membrane 4 according to a preferred embodiment of the present invention. The CIP process is carried out at the same time 64 for both the prior art filtration membrane and the filtration membrane 4 according to a preferred embodiment of the present invention. The CIP process is a process of cleaning the surface of the filtration layer 6 of the filtration membrane 4. It is possible to carry out the CIP process in a filtration system 2 without disassembling the filtration system 2. Often, cleaning chemicals are used to achieve a sufficient cleaning of the surface. The CIP process is carried out in order to clean the filtration membrane, so that the flux ratio is increased after a period of use where fouling and/or clogging have been induced.

When the curves 66' and 68' are compared to one another, it is noticeable that the filtration membrane 4 according to a preferred embodiment of the present invention is less sensitive to fouling than the non-modified filtration membrane. The protective layer 40 attached on the surface of the filtration layer 6 of the filtration membrane 4 can explain this difference.

It is possible to make similar curves showing the transmembrane pressure (TMP) as function of time 62 instead of the flux ratio 60 versus time 62. In fact, both the flux ratio 60 and the TMP indicate the filter capacity of the filtration membrane 4. When the flux ratio is close to 100% the filtration membrane is clean and suitable for being used to filter a fluid 14. When the flux ratio 60 is reduced the filter capacity of the filtration membrane 4 is also reduced. A low TMP indicates that the filtration membrane 4 is clean, and thus that the filtration membrane 4 has a high filter capacity. A high TMP indicates that a fouling layer causes clogging of the filtration layer of the filtration membrane 4 and that the filtration membrane 4 needs to be cleaned. The limits imposed on when to initiate, for example, a back-flush or a CIP process, depends on the specific filtration system and the fluid under investigation.

It can be seen from FIG. 8b that the flux ratio 60 is increased following the CIP process. This is indicated by the increasing curve portions 70 in FIG. 8b.

Figure 9:
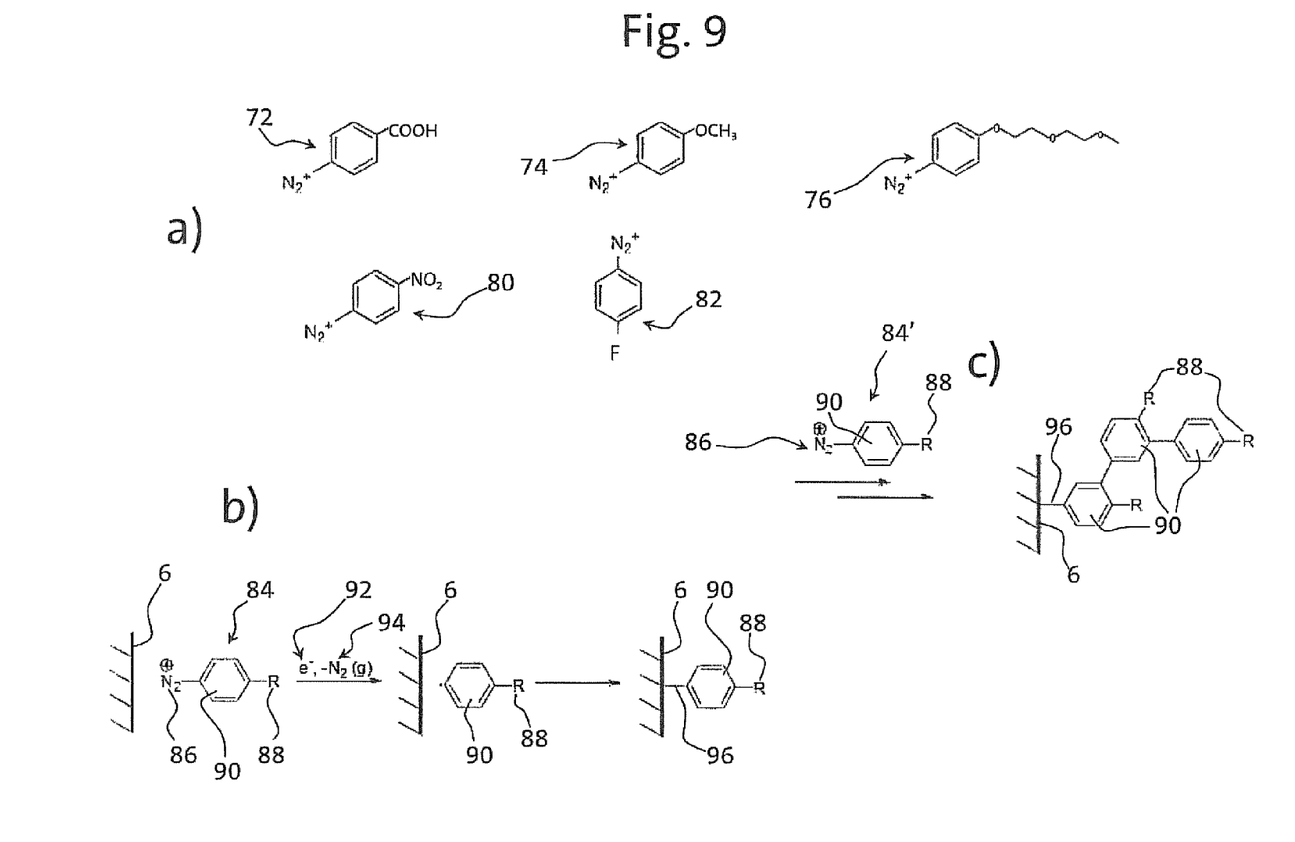
FIG. 9*a* shows examples of compounds that can be used to build an anti-fouling layer on a filtration layer of a filtration membrane.
FIG. 9*b* shows example of a compound reaction leading to deposition of an anti-fouling layer on a filtration layer of a filtration membrane.
FIG. 9*c* shows how additional layers can be added to the layer shown in FIG. 9.

FIG. 9a illustrates a number of diazonium salts 72, 74, 76, 78, 80 that may be used to build an anti-fouling layer (a protective surface layer) on a filtration layer 6 of a filtration membrane 4 according to a preferred embodiment of the present invention.

The diazonium salt 72 is 4-(carboxyl) phenyl diazonium tetrafluoroborate which is easily synthesized using protocols well known to a person skilled in the art from the pertinent precursor (p-amino-benzoic acid). It may be advantageous to use this particular diazonium due to its hydrophilic character as well as its ability to be deprotonated/protonated as a function of pH; i.e., reversibly tune its hydrophilic character. This may be advantageous in media in which increasing the hydrophilic character of the membrane reduces the propensity of membrane fouling. It is also known that charged layers on membranes have a tendency to reduce fouling.

The diazonium salt 74 is 4-(methoxy) phenyl diazonium tetrafluoroborate which is easily synthesized using protocols well known to a person skilled in the art from the pertinent precursor (p-methoxy aniline) Another highly related compound is provided by the commercially available Fast Blue BB salt. It may be advantageous to use these particular diazonium salts as they provide a simplified system incorporating the ether linkage between the benzene ring and substituent. This, in part, increases the hydrophilic character of the film and due to the electron donating nature of these substituents, these compounds are comparatively easy to oxidixe (so that the protective surface layer can be cleaved off, by way of example).

The diazonium salt 76 is 4-(2-(2-(methoxy)ethoxy)ethoxy) phenyl diazonium tetrafluoroborate which may offer significant advantages in that it incorporates an albeit short polyethylene glycol function in the layer. Such polyethylene glycol functionalities in membranes have, by others, been shown to make membranes much less prone to fouling. In particular, it is known to reduce the so-called adsorptive fouling in which a first layer of water molecules is replaced by the fouling solute. This phenomenon is mainly due to its hydrophilic character. This may be advantageous in media in which increasing the hydrophilic character of the membrane reduces the propensity of membrane fouling.

The fourth example 78 is 4-(nitro) phenyl diazonium tetrafluoroborate which is a well known diazonium salt to a person skilled in the art. The advantage of this particular salt is that its hydrophilic character may be varied by controlling the oxidation state of the appended nitrogen atom. In the highest oxidation state, NO2, it is marginally polar, but can easily (by electrochemical means, for example) be transformed into the reduced forms such as hydroxyl amine, —NHOH, or amine, —NH2. These latter forms will have pH activity and thus also have the option to exercise controlled hydrophilic character.

The final example, 80, is 4-(fluoro) phenyl diazonium tetrafluoroborate. The advantage of this particular species is that is introduces fluorinated functionalities on the surface on the membrane layer. This may increase the chemical resistance of the protective surface layer 40 as well as reduce the propensity of certain types of fouling to adsorb to the surface of the membrane.

As an additional embodiment, combinations of two or more diazonium salts to impose bi- and trifunctional layers on the surface may be advantageous to reduce particular types of fouling on the surface.

FIG. 9b illustrates an example of a compound reaction causing deposition of an anti-fouling layer (protective surface layer 40) on a filtration layer 6 of a filtration membrane 4 according to a preferred embodiment of the present invention. The central idea is that the diazonium salt 84 is electrochemically reduced in a one-electron process to release nitrogen gas 94 and the corresponding carbon centred radical. This radical 88 can then proceed according to a range of reaction mechanisms including homogeneous reactions, but most importantly also attach to the surface of the filtration layer 6. While the nature of the bond produced between the surface of the electrode and the layer has been the subject of some debate, there exists little doubt that the bonds 96 so made are strong and can persist even in strong ultrasonic cleaning protocols.

FIG. 9c illustrates how additional layers of a compound 84' can be added to a compound 84 that is attached to the filtration layer 6 of a filtration membrane 4, such as the one shown in FIG. 9b. The grafting process involving diazonium salts does not stop at the level indicated in FIG. 9b. Rather, the electrochemically generated radicals may react with groups already attached to the surface of the filtration layer 6. The degree to which this secondary process continues can, to some extent, be controlled by the applied electrochemical potential on the working electrode. The potential control exercised can have significant ramifications on the layer structure, density, and thickness. This will be known to a person skilled in the art.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A filtration membrane (4) comprising a porous base layer (8) attached to an electrically conductive filtration layer (6) having pores (10) extending through the filtration layer (6), wherein at least one diazonium compound (24, 26) is attached on the filtration layer (6) and thereby provides a protective surface layer (40), the protective surface layer (40) being configured to be at least partially cleaved off of the filtration layer (6) by a predefined cleave-off process, such that foulants (42, 43, 44) which are present in a fluid (14) entering the pores (10) of the filtration layer (6) are removed with the protective surface layer (40) and so as to enable a new protective surface layer (40) to be grafted on the filtration layer (6) before the filtration layer (6) is reused to filter the fluid (14).

2. The filtration membrane (4) according to claim 1, wherein the at least one diazonium compound (24, 26) is configured to be attached on the filtration layer (6) and at least partially cleaved off of the filtration layer (6) by a reversible electrochemical process.

3. The filtration membrane (4) according to claim 2, wherein the protective surface layer (40) comprises one or more layers of the at least one diazonium compound, and wherein the filtration membrane (4) is configured such that the thickness of the protective surface layer (40) is controlled by using the electrochemical process.

4. The filtration membrane (4) according to claim 1, wherein the at least one diazonium compound (24, 26) is a diazonium salt: $R—N_2^+X^-$, where R is aryl and where X is an inorganic or organic anion.

5. The filtration membrane (4) according to claim 1, wherein the at least one diazonium compound (24, 26) comprises one or more compounds configured to form a diazonium salt having the following form: $R—N_2^+X^{31}$, where R is aryl and where X is an inorganic anion.

6. The filtration membrane (4) according to claim 1, wherein the at least one diazonium compound is selected from one of the following:

7. The filtration membrane (4) according to claim 1, wherein the filtration layer (6) is a metal layer.

8. The filtration membrane (4) according to claim 7, wherein the filtration layer (6) is made of stainless steel.

9. The filtration membrane (4) according to claim 1, wherein the filtration layer (6) is made of an electrically conductive composite or carbon.

10. The filtration membrane (4) according to claim 1, wherein the porous base layer (8) and the filtration layer (6) are made of the same material.

11. The filtration membrane (4) according to claim 10, wherein the porous base layer (8) and the filtration layer (6) are made of stainless steel.

12. The filtration membrane (4) according to claim 1, wherein a pore size in the filtration layer (6) is within the range of between 5 nm and 500 nm.

13. The filtration membrane (4) according to claim 1 wherein a pore size in the porous base layer (8) is within the range of between 100 nm to 100 μm.

14. The filtration membrane (4) according to claim 1, wherein a thickness of the filtration layer (6) is 50 nm-10 μm.

15. The filtration membrane (4) according to claim 1, wherein a thickness of the porous base layer (8) is 300-3000 μm.

16. A filtration system (2) comprising a filtration membrane (4) according to claim 1.

17. A method for filtration of a fluid (14) comprising filtering a fluid (14) using a filter membrane (4) according to claim 1.

18. A filtration membrane (4) comprising a porous base layer (8) attached to an electrically conductive filtration layer (6) having pores (10) extending through the filtration layer (6), wherein the filtration layer (6) is a metal layer, and wherein at least one compound (24, 26) is attached on the filtration layer (6) and thereby provides a protective surface layer (40), the protective surface layer (40) being configured to be at least partially cleaved off of the filtration layer (6) by a predefined cleave-off process, such that foulants (42, 43, 44) which are present in a fluid (14) entering the pores (10) of the filtration layer (6) are removed with the protective surface layer (40) and so as to enable a new protective surface layer (40) to be grafted on the filtration layer (6) before the filtration layer (6) is reused to filter the fluid (14).

19. The filtration membrane (4) according to claim 18, wherein the filtration layer (6) is made of stainless steel.

20. A filtration membrane (4) comprising a porous base layer (8) attached to an electrically conductive filtration layer (6) having pores (10) extending through the filtration layer (6), wherein the porous base layer (8) and the filtration layer (6) are made of the same material, and wherein at least one compound (24, 26) is attached on the filtration layer (6) and thereby provides a protective surface layer (40), the protective surface layer (40) being configured to be at least partially cleaved off of the filtration layer (6) by a predefined cleave-off process, such that foulants (42, 43, 44) which are present in a fluid (14) entering the pores (10) of the filtration layer (6) are removed with the protective surface layer (40) and so as to enable a new protective surface layer (40) to be grafted on the filtration layer (6) before the filtration layer (6) is reused to filter the fluid (14).

* * * * *